United States Patent [19]

Becher et al.

[11] Patent Number: 4,971,933
[45] Date of Patent: Nov. 20, 1990

[54] TERNARY CERAMIC ALLOYS OF ZR-CE-HF OXIDES

[75] Inventors: Paul F. Becher, Oak Ridge, Tenn.; Eric F. Funkenbusch, White Bear Lake, Minn.

[73] Assignee: Martin Marietta Energy Systems, Inc., Oak Ridge, Tenn.

[21] Appl. No.: 323,633

[22] Filed: Mar. 14, 1989

[51] Int. Cl.$^5$ .............................................. C04B 35/48
[52] U.S. Cl. ................................... 501/103; 501/102; 501/134
[58] Field of Search ........................ 501/103, 102, 134

[56] References Cited

U.S. PATENT DOCUMENTS

| 4,279,655 | 7/1981 | Garvie et al. | 501/20 |
| 4,595,663 | 6/1986 | Krohn et al. | 501/103 |
| 4,657,877 | 4/1987 | Becher et al. | 501/89 |
| 4,690,910 | 9/1987 | Tsukuma et al. | 501/103 |

FOREIGN PATENT DOCUMENTS 3716589 12/1988 Fed. Rep. of Germany.
2226859 10/1987 Japan.

OTHER PUBLICATIONS

Christian Marcilly et al., "Preparation of Highly Dispersed Mixed Oxides & Oxide Solutions by Pyrolysis of Amorphous Organic Precursors" *J. Am. Ceram. Soc.*, vol. 53, No. 1, pp. 56, 57.
J. J. Blum et al. "Processing of Improved Transformation-Toughened Ceramics" in Oak Ridge National Laboratory Report No. TM-10705, pp. 95-111, Mar. 1988.
H. Olapinski, K. M. Friedrich, "High Temperature Durability of Zirconia" (abs. Only) Presented at 2nd International Symp. *Ceramic Materials & Components for Engines*, Lubeck-Travemunde, FRG, Apr. 14-17, 1986.
"Processing of Sinterable Transformation Toughened Ceramics for Application in Ceramic Technology for Advanced Heat Engine Projects, final Report" G. A. Rossi et al. Report #ORNL/SUB/85-22031/1, Sep. 1988.
P. F. Becher et al. "Transformation-Toughening Behavior in Ceramics", *Advances in Ceramics*, vol. 24, pp. 645-651 (1988).
P. F. Becher et al. "Relation of Transformation Temperpature to the Fracture Toughness of Transformation-Toughened Ceramics" *J. Materials Science*, vol. 22 (1987) pp. 76-84.
P. F. Becher "Subcritical Crack Growth in Partially Stabilized $ZrO_2(MgO)$" *J. Materials Science*, vol. 21 (1986) pp. 297-300.

*Primary Examiner*—William R. Dixon, Jr.
*Assistant Examiner*—Sue Hollenbeck
*Attorney, Agent, or Firm*—J. D. Griffin; Bruce M. Winchell

[57] ABSTRACT

A ternary ceramic alloy which produces toughening of zirconia and zirconia composites through the stress transformation from tetragonal phase to monoclinic phase. This alloy, having the general formula $Ce_xHf_yZn_{1-x-y}O_2$, is produced through the addition of appropriate amounts of ceria and hafnia to the zirconia. Typically, improved toughness is achieved with about 5 to about 15 mol % ceria and up to about 40 mol % hafnia. The preparation of alloys of these compositions are given together with data as to the densities, tetragonal phase content, hardness and fracture toughness. The alloys are useful in preparing zirconia bodies as well as reinforcing ceramic composites.

6 Claims, 1 Drawing Sheet

TERNARY CERAMIC ALLOYS OF ZR-CE-HF OXIDES

The U.S. Government has rights in this invention pursuant to contract No. DE-AC05-840R21400 awarded by U.S. Department of Energy contract with Martin Marietta Energy Systems, Inc.

TECHNICAL FIELD

The present invention relates generally to transformation toughing in ceramics and ceramic composites, and more particularly to a novel ceramic alloy containing multiple solute additions whereby selected toughening is achieved for specific applications. The alloy system involves the oxides of zirconium, hafnium and cerium.

BACKGROUND ART

Ceramics and ceramic composites are being used in increasing proportions for various structural applications. One such use is in the fabrication of components for internal combustion engines. Ceramics alone are generally considered to be brittle and, thus, reinforcing fibers or whiskers are often added to produce ceramic composites. Some strengthing and toughening can also be achieved in certain zirconium-containing ceramics through a transformation in zirconium of a normally tetragonal phase to the monoclinic phase caused by the application of a tensile stress. This type of toughening is known as "transformation toughening" and the degree thereof is a function of the composition of the ceramic since the composition affects the ease of transforming the tetragonal phase, i.e., lowering the applied stress required to cause the transformation results in greater toughening effects.

Tetragonal zirconia ($ZrO_2$) is one of the ceramics that has potential for many structural applications. This material has been shown to be toughened through the transformation process. A number of stabilizing oxides, such as MgO, CaO, $CeO_2$ and $Y_2O_3$ have been used to produce tetragonal zirconia. These oxides are often mechanically mixed with the zirconia powders which can result in compositional inhomogenity of the stabilizer and thus adversely affect any toughening.

It is therefore an object of this invention to provide an improved composition, and a method for making the same, for the transformation toughening of ceramics.

Another object of the invention is to provide a ceramic alloy exhibiting high fracture toughness.

Another object of the present invention is to provide a crystal structure that is substantially all tetragonal phase but that will transform, at least in part, to monoclinic phase when stressed.

A further object of this invention is to provide a method and composition which permits tailoring the toughness of a ceramic body to meet a particular use requirement.

It is also an object of the invention to provide a ternary ceramic alloy of Zr-Ce-Hf oxides having improved and selectable toughness for use in many applications.

These and other objects of the present invention will become apparent upon consideration of the detailed description which follows.

DISCLOSURE OF INVENTION

In accordance with the present invention, there is provided a new ternary alloy of the general formula $Ce_xHf_yZr_{1-x-y}O_2$. Ceramics of this general type have been found to possess high fracture toughness. Further, the alloys provide the means to compositionally control the martensitic start temperature and the stress required to induce the transformation in a precise way by varying values of x and y. Thus, the toughness of the resulting ceramic body can be tailored to meet the desired use requirements.

BEST MODE OF THE INVENTION

Figure 1:
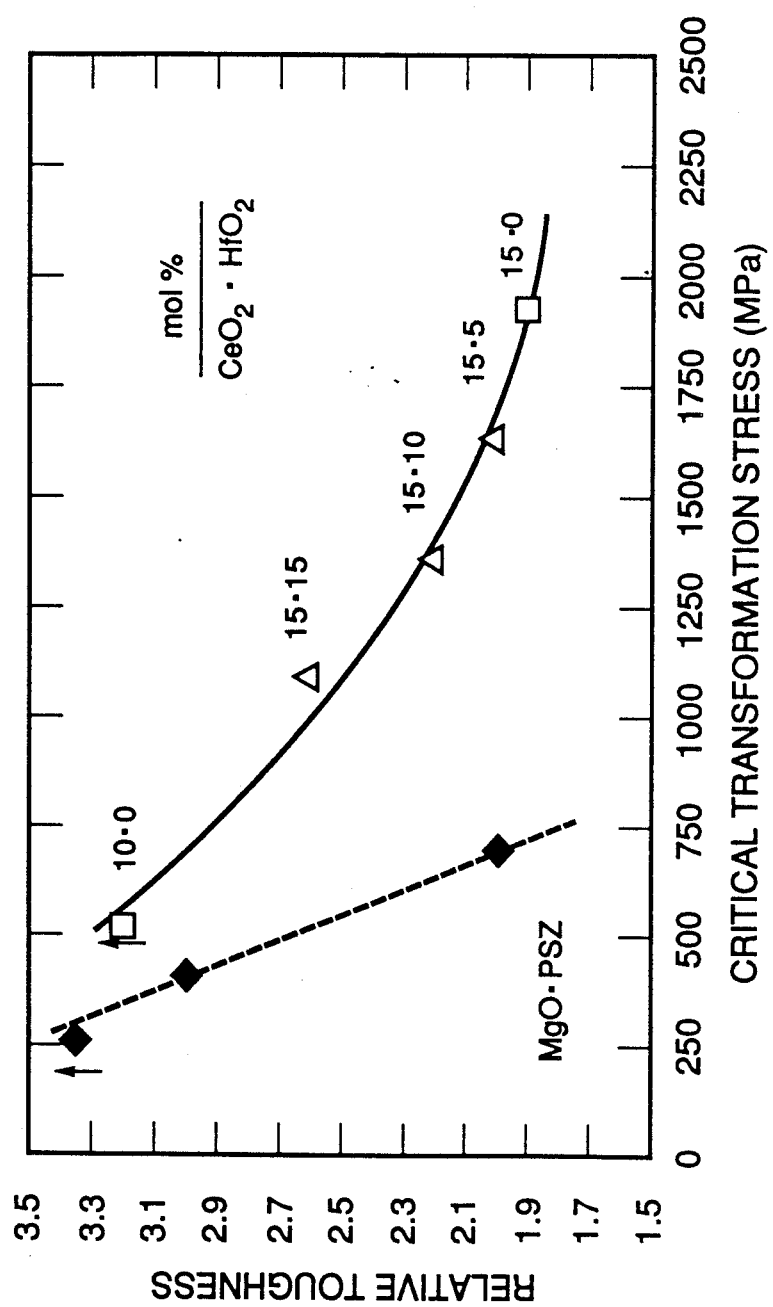
FIG. 1 is a plot illustrating the improved relative toughness of the ternary alloy of the present invention, as a function of the critical transformation stress, as related to a prior art zirconia ceramic containing magnesia.

The present invention involves the use of controlled additions of ceria ($CeO_2$) and hafnia ($HfO_2$) to zirconia ($ZrO_2$) to form powders of uniform composition which can then be sintered, hot pressed or hot isostatically pressed to full density to form fine grained tetragonal zirconias. The product can be a toughened monolithic zirconia ceramic, or can be a ceramic composite consisting of a matrix having dispersed therein a partially stabilized $ZrO_2$ phase having the above-cited general composition. The important feature of the invention is the ability to vary the amounts of the additions to the zirconia, thus permitting manipulation of the stress at which transformation occurs as well as the temperature dependence of the toughening process. Since most commercial grades of zirconium contain 0.5 to 2 mol % hafnium as an impurity, it is to be understood that the present invention involves the controlled addition of greater amounts of hafnium to achieve the desired effects.

The use of the dual solutes in the zirconia, i.e., $CeO_2$ and $HfO_2$, provides a means for tailoring the toughening. For example, ceria is known to decrease the temperature at which the tetragonal phase begins to spontaneously transform to the monoclinic phase: hafnia is known to increase the transition temperature. Thus, by controlling the amount of each solute, the toughening achieved by the present invention can be regulated.

Various alloys, in which the solutes were selected to give a range of toughness, were produced by mixing solutions of the appropriate oxides to form intimate mixtures containing the necessary metallic components. The precursors for the powders were zirconium oxynitrate, hafnium oxynitrate, and cerium nitrate. The zirconium and hafnium salts were obtained from Teledyn Wah Chang, Albany, Oreg. The hafnium content of the Zr salt was 0.0052 mol % of the Zr content, and the Zr content of the hafnium salt was 0.94 mol % of the Hf content. These levels are below those of standard commercial materials. The corresponding metal oxide contents of the precursors were determined after calcination at 1000 degrees C. in air. The powders can be produced by several known methods. One such method involves dissolving the respective nitrate salts in distilled water. Two moles of citric acid were added for every mole of metal cation. Following complete dissolution, the clear solution was heated to 70–90 degrees C. and allowed to evaporate slowly. During this evaporation the viscosity increased but there was no precipitation. Heating was continued until the citric acid, the nitrates and other non-oxide species present were substantially decomposed. The following examples provide additional information as to the preparation of the oxide powder of the present invention.

EXAMPLE I

This example describes the preparation of an oxide powder containing 80.75 mol % $ZrO_2$, 15.00 mol % $CeO_2$, and 4.25 mol % $HfO_2$.

To a 150×75 mm crystallizing dish was added about 500 ml of distilled water. To this was added 30.0 g of zirconium oxynitrate (45.8 wt % $ZrO_2$ equivalent), 2.1 g of hafnium oxynitrate (59.1 wt % $HfO_2$ equivalent), and 9.0 g of cerous nitrate hexahydrate (39.6 wt % $CeO_2$ equivalent). When all of the salts were dissolved 58.0 g of citric acid monohydrate were added. Following complete dissolution, water and other volatiles were slowly removed by warming the solution to about 70 to 90 C. The viscosity of the solution increased as its volume decreased; however, no precipitation was observed. Heating was continued until the citric acid, nitrates, and other species present had largely decomposed. The solid thus formed was lightly broken up and calcined for 24 hours at 600 C. in air resulting in a bright yellow powder.

EXAMPLE II

This example describes the preparation of an oxide power containing 72.25 mol % $ZrO_2$, 15.00 mol % $CeO_2$, and 12.75 mol % $HfO_2$.

The same procedure followed in Example I was employed; however, the amounts of the reagents used were 26.8 g of zirconium oxynitrate, 6.3 of hafnium oxynitrate, 9.0 g of cerous hexanitrate, and 50.0 g of citric acid monohydrate. Calcination produced the bright yellow powder.

An ethanol solution containing 4 wt % stearic acid (based on the weight of the solid) was added to the calcined and milled powder. This mixture was wet milled for about 1 hour, followed by the evaporation of the ethanol. The material was then dry milled for about 8 hours, and cold pressed at 2500 psi and isostatically pressed at 30,000 psi. The stearic acid was removed by heating to 600 degrees C. over an 18 hour period. The compacts were heated in alumina boats for sintering, with the temperature increased at about 100 degrees C. each five minutes up to 1600 degrees C., with the temperature held at this upper level for about 90 minutes. Cooling followed the same rate down to 1000 degrees C. at which point the sintered pieces were furnaced cooled. The resulting ceramic bodies were typically closed to theoretical density (>95%) and had grain sizes of about two micrometers.

In another variation of the making of the ternary alloys of the present invention, the wet milling was carried out after the addition of isopropanol. The isopropanol was then removed, and 2 wt % stearic acid dissolved in acetone was added. After removal of the acetone, the powders were cold pressed at 10,000 psi and isostatically pressed at 35,000 psi. Sintering was accomplished by heating rapidly to 1600 degrees C., with that temperature being held for about 2 hours. The material was then furnace cooled. The compacts formed using this procedure had substantially the same properties as those produced by the first described procedure.

Using these procedures, zirconia bodies containing from 0 to 20 mol % ceria were prepared as well as zirconia bodies containing 0 to about 40 mol % hafnia and 10 to 20 mol % ceria. The mol % given are cation mol %. When these mol % are divided by 100, the cation mole fraction is obtained for the values of x and y in the formula $Ce_xHf_yZr_{1-x-y}O_2$.

Small quantities of dopants are difficult to control, i.e., the composition may show inhomogeneity yielding erratic results. When the dopant content is increased, compositional control is easier and, thus, it is easier to maintain and control the tetragonal phase content. As shown in Table 1, increasing the ceria content from 5 to $\geq 12$ mol % increases the tetragonal phase content. A problem arises in that at very high ceria content ($\geq 15$ mol %) the tetragonal $ZrO_2$ phase becomes too stable and no stress induced transformation to the monoclinic phase occurs; thus, no toughening occurs. This is illustrated in Table 1 and FIG. 1 where the toughness is seen to decrease as $CeO_2$ content increases. As shown in FIG. 1, as the $CeO_2$ content increases from 10 mol % to 15 mol %, the relative toughness decreases from about 3.3 to about 1.9 while the required stress to cause transformation increases from 500 MPa to almost 2000 MPa. Relative toughness is the ratio of the measured toughness to that of tetragonal zirconia in which absolutely no transformation occurs.

The addition of $HfO_2$ to the $CeO_2$-doped $ZrO_2$ counters the $CeO_2$ effect. For example, in a 15 mol % $CeO_2$-doped $ZrO_2$, increasing the amount of $HfO_2$ substituted for $ZrO_2$ decreases the amount of tetragonal phase retained. Addition of a relatively large amount of $HfO_2$ is equivalent to a small change in $CeO_2$ content which provides greater control over the transformation parameters. By the addition of both $CeO_2$ and $HfO_2$, substantially all tetragonal phase is obtained and yet the transformation is permitted to occur in a stress range which will result in an increase in fracture toughness of the composition. The combination of $CeO_2$ and $HfO_2$ thus gives greater flexibility, permitting design of the material to transform in a desired stress range and increase fracture toughness. This is illustrated by the data in Table 1 which shows an increase in toughness as the $HfO_2$ content increase from 0 to 15 mol %. FIG. 1 also shows the effect of both $CeO_2$ and $HfO_2$ on the transformation of tetragonal $ZrO_2$. As the $HfO_2$ content increases in $ZrO_2$ containing 15 mol % $CeO_2$, the relative fracture toughness increases while the critical transformation stress decreases.

While the addition of $7\frac{1}{2}$ mol % $CeO_2$ in $ZrO_2$, as shown in Table I, produced only 3-5 mol % tetragonal phase $ZrO_2$, it should be understood that this is not the lower limit of $CeO_2$ content in accordance with this invention. All the specimen examined, including those shown in Table I, were prepared by conventional ceramic techniques in which ceramic powders were pressed and pressureless sintered at temperatures up to 1600 deg. C. Under these conditions, the grain size in the as-fired ceramic is typically 2-4 micrometers. Using special processing techniques, such as hot isostatic pressing, hot pressing, microwave sintering, etc., the fully dense materials can be obtained at lower temperatures and thus with minimal grain growth. In this situation, the grains are typically less than 1 micrometer and the tetragonal phase content will increase upwards to 100%. Thus, the tetragonal phase content in a submicron grained $ZrO_2$ may be >50% when the $CeO_2$ content is in the range of 5 to 8 mol %.

Referring to Table II, the increase in the ability to initiate transformation by application of stress is illustrated by comparing the monoclinic phase content in as-fired surfaces to as-ground surfaces as a function of dopant content. It can be seen that a $ZrO_2$ structure containing 15 mol % $CeO_2$ was essentially 100% tetragonal phase as-fired. Application of stress by diamond grinding of the surface yielded a transformation to the monoclinic phase of only about 2% as indicated by x-ray techniques. The addition of 10 and 20 mol % $HfO_2$ to the 15 mol % $CeO_2$ doped $ZrO_2$ resulted in an increase in monoclinic phase upon application of stress by diamond surface grinding and, thus, an increase in fracture toughness.

Also, it can be seen in Table II that the martensite start temperature ($M_s$) on cooling decreases as the ceria content increases. With the addition of $HfO_2$, the $M_s$ temperature is increased. Prior studies show that the room temperature toughness of tetragonal zirconias will increase as the $M_s$ temperature is increased upwards towards 22 deg. C.

From the foregoing it will be understood by persons versed in the art that the toughness of zirconia-containing materials can be increased by the appropriate additions of both hafnia and ceria to produce a ternary ceramic alloy of Zr-Ce-Hf oxides. While only specific compositions have been given herein, these are for illustration only and not for limitation. Rather, the invention is to be limited only by the appended claims and their equivalents when taken together with the complete description.

TABLE I

Examples of Properties of Sintered Polycrystalline $ZrO_2$ Ceramics Containing $CeO_2$ and $HfO_2$ Additions.

| Solute Content, mol % | | Density+ g/cm³ | Tetragonal Content* % | Hardness** GPA | Fracture Toughness++ MPa √m |
|---|---|---|---|---|---|
| $CeO_2$ | $HfO_2$ | | | | |
| 5 | — | 5.5 | <5 | — | — |
| 7.5 | — | 5.8 | <10 | 6.2 | 6 |
| 10 | — | 6.1 | ≧90 | 8.4 | 8–9 |
| 12.5 | — | 6.2 | 100 | 9.5 | 9–12 |
| 15 | — | 6.1 | 100 | 9.6 | 5–6 |
| 15 | 5 | 6.3 | 100 | 9.8 | 6–6.5 |
| 15 | 10 | 6.4 | 100 | — | 6.5–7.0 |
| 15 | 15 | 6.5 | 99 | — | 7.5–8.0 |
| 15 | 25 | 7.0 | 100 | — | — |
| 15 | 30 | 7.0 | 0 | — | — |
| 15 | 40 | 6.6 | 30 | — | — |

+Sintered at 1600 deg. C. in air for ~2 hours.
*x-ray diffraction of as-fired surface; remainder is monoclinic $ZrO_2$.
**Diamond Pyrimid Hardness (DPH) indentation, 500 gram load
++Determined from crack length generated by ≧10 Kg DPH indentation at 22 deg. C.

TABLE II

Amount of Tetragonal to Monoclinic Transformation Increases (e.g. Martensite Start temperature Ms increases, % monoclinic increases after grinding) with decrease in $CeO_2$ and/or increase in $HfO_2$ content.

| Solute Content mol % | | $M_s$* g/cm³ | Monoclinic Content+ % | | Fracture Toughness** MPa m |
|---|---|---|---|---|---|
| $CeO_2$ | $HfO_2$ | | As fired surface | As ground++ surface | |
| 10 | — | −75 | <10 | — | — |
| 12 | — | −110 | 0 | — | — |
| 15 | — | <−175 | 0 | 2 | 5.0 |
| 15 | 10 | — | 0 | 6 | 6.0 |
| 15 | 20 | −135 | 1 | 15 | 7.5 |

*Martensite start temperature determined by low temperature dilatometry.
+ x-ray diffraction data for as fire surfaces.
++ Surface machined with 180 grit diamond - resinoid bond surface grinding wheel using 0.025 mm depth of cut.
**Determined from surface crack length generated by Diamond Pyramid Hardness indentation using 20 kg load at 22 deg. C.

We claim:

1. A ternary ceramic alloy that is substantially all tetragonal phase but will transform, at least in part, to monoclinic phase when stressed, said alloy having the formula $Ce_xHf_yZr_{1-x-y}O_2$, where x varies from about 0.05 to about 0.15, and y varies from about 0.02 up to about 0.40 and wherein toughness of said alloy is selectable by varying the values of x and y.

2. The alloy of claim 1 wherein x is from about 0.07 to 0.15, and y is about 0.05 to 0.20.

3. The alloy of claim 2 wherein x is about 0.15, and y is about 0.15.

4. A ceramic composite body having increased toughness, said composite body including a matrix material together with a ternary ceramic alloy of zirconia, ceria and hafnia, said ternary ceramic alloy being substantially all tetragonal phase but transformable, at least in part, to monoclinic phase when stressed, said alloy having the general formula $Ce_xHf_yZr_{1-x-y}O_2$, where x is between about 0.05 and 0.15, and y is up to about 0.40 and wherein toughness of said ceramic composite is selectable by varying the values of x and y.

5. The composite of claim 4 wherein x is from about 0.07 to about 0.15, and y is about 0.05 to about 0.40.

6. The composite of claim 5 wherein x is about 0.15 and y is about 0.15.

* * * * *